United States Patent
McHugh et al.

(10) Patent No.: US 10,965,610 B1
(45) Date of Patent: *Mar. 30, 2021

(54) SYSTEMS AND METHODS FOR ALLOCATING SHARED RESOURCES IN MULTI-TENANT ENVIRONMENTS

(71) Applicant: Facebook, Inc., Menlo Park, CA (US)

(72) Inventors: Jason George McHugh, Seattle, WA (US); Mark Warren McDuff, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,395

(22) Filed: Feb. 12, 2020

Related U.S. Application Data

(63) Continuation of application No. 15/809,764, filed on Nov. 10, 2017, now Pat. No. 10,601,726.

(51) Int. Cl.
| | |
|---|---|
| *G06F 15/173* | (2006.01) |
| *H04L 12/911* | (2013.01) |
| *H04L 29/08* | (2006.01) |
| *G06F 9/50* | (2006.01) |

(52) U.S. Cl.
CPC ............ *H04L 47/70* (2013.01); *G06F 9/50* (2013.01); *H04L 67/10* (2013.01); *H04L 67/1002* (2013.01)

(58) Field of Classification Search
CPC ..... H04L 47/70; H04L 67/1002; H04L 67/10; G06F 9/50
See application file for complete search history.

(56) References Cited

U.S. PATENT DOCUMENTS

| | | | |
|---|---|---|---|
| 8,271,641 | B2 | 9/2012 | Fry et al. |
| 9,031,223 | B2 | 5/2015 | Smith et al. |
| 10,601,726 | B2 * | 3/2020 | McHugh ............... G06F 9/5072 |
| 2010/0077449 | A1 | 3/2010 | Kwok et al. |
| 2013/0254407 | A1 | 9/2013 | Pijewski et al. |
| 2014/0358620 | A1 | 12/2014 | Krebs et al. |
| 2015/0172206 | A1 | 6/2015 | Anderson et al. |
| 2016/0232468 | A1 | 8/2016 | Meiri et al. |

(Continued)

OTHER PUBLICATIONS

YouTube, "Mulit-tenancy: What it means to you.", URL: https://www.youtube.com/watch?v=Kg_SHjp3DQ4; Jan. 19, 2012, 3 pages.

(Continued)

*Primary Examiner* — John B Walsh
(74) *Attorney, Agent, or Firm* — FisherBroyles, LLP

(57) ABSTRACT

The disclosed computer-implemented method may include (1) for each tenant in a plurality of tenants within a multi-tenant service system, assigning a probability factor to the tenant that indicates a likelihood that the tenant will be selected when a resource of the multi-tenant service system is available, (2) detecting that the resource of the multi-tenant service system is available, (3) probabilistically selecting a tenant from the plurality of tenants by using the probability factors assigned to the tenants in the plurality of tenants, and (4) directing the multi-tenant service system to allocate the resource to the selected tenant for execution of a work item received from the selected tenant. Various other methods, systems, and computer-readable media are also disclosed.

20 Claims, 6 Drawing Sheets

(56) References Cited

U.S. PATENT DOCUMENTS

2018/0365077 A1 12/2018 Grafham et al.
2019/0149478 A1 5/2019 McHugh et al.

OTHER PUBLICATIONS

Wikipedia, "Multitenancy", URL: https://en.wikipedia.org/wiki/Multitenancy, as accessed on Oct. 20, 2017, 4 pages.
Non-Final Office Action received for U.S. Appl. No. 15/809,764 dated Aug. 7, 2019, 18 pages.
Notice of Allowance received for U.S. Appl. No. 15/809,764 dated Nov. 12, 2019, 11 pages.

\* cited by examiner

Chart 400

| 402 | Tenants 208 | 1 | 2 | 3 |
|---|---|---|---|---|
| | Probability Factors 210 | 0.25 | 0.25 | 0.50 |

| 404 | Tenants 208 | 1 | 2 | 3 |
|---|---|---|---|---|
| | Probability Factors 210 | 0.33 | 0.33 | 0.33 |

| 406 | Tenants 208 | 1 | 2 | 3 |
|---|---|---|---|---|
| | Probability Factors 210 | 0.40 | 0.20 | 0.40 |

| 408 | Tenants 208 | 1 | 2 | 3 |
|---|---|---|---|---|
| | Probability Factors 210 | 0.50 | 0.50 | 0.00 |

| Tenants 208 | 1 | 2 | 3 | 4 | 5 | 6 | Total Work Value |
|---|---|---|---|---|---|---|---|
| Weight Factor 220 | 2 | 1 | 3 | 1 | 4 | 1 | |
| Queue Sizes 222 | 1 | 1 | 2 | 1 | 1 | 1 | |
| Recency Factors 226 | 1 | 1 | 1 | 1 | 1 | 1 | |
| Work Values 218 | 2 | 1 | 6 | 1 | 4 | 1 | 15 |
| Probability Factors 210 | 0.133 | 0.067 | 0.400 | 0.067 | 0.267 | 0.067 | |

| Tenants 208 | 1 | 2 | 3 | 4 | 5 | 6 | Total Work Value |
|---|---|---|---|---|---|---|---|
| Weight Factors 220 | 2 | 1 | 3 | 1 | 4 | 1 | |
| Queue Sizes 222 | 1 | 1 | 2 | 1 | 0 | 1 | |
| Recency Factors 226 | 1.01 | 1.01 | 1.01 | 1.01 | 1 | 1.01 | |
| Work Values 218 | 2.02 | 1.01 | 6.06 | 1.01 | 0 | 1.01 | 11.11 |
| Probability Factors 210 | 0.182 | 0.091 | 0.545 | 0.091 | 0.000 | 0.091 | |

| Tenants 208 | 1 | 2 | 3 | 4 | 5 | 6 | Total Work Value |
|---|---|---|---|---|---|---|---|
| Weight Factors 220 | 2 | 1 | 3 | 1 | 4 | 1 | |
| Queue Sizes 222 | 1 | 1 | 1 | 1 | 0 | 1 | |
| Recency Factors 226 | 1.02 | 1.02 | 1 | 1.02 | 1.01 | 1.02 | |
| Work Value 218 | 2.04 | 1.02 | 3 | 1.02 | 0 | 1.02 | 8.1 |
| Probability Factors 210 | 0.252 | 0.126 | 0.370 | 0.126 | 0.000 | 0.126 | |

SYSTEMS AND METHODS FOR ALLOCATING SHARED RESOURCES IN MULTI-TENANT ENVIRONMENTS

CROSS REFERENCE TO RELATED APPLICATION

This application is a continuation of U.S. patent application Ser. No. 15/809,764, filed Nov. 10, 2017, the disclosure of which is incorporated, in its entirety, by this reference.

BACKGROUND

An increasing number of organizations, enterprises, and individuals are utilizing cloud computing services to perform a variety of tasks. Such cloud computing services may employ multi-tenant environments and/or architectures to share a common set of computing resources (e.g., processing resources, storage resources, memory resources, network resources, etc.) among multiple tenants.

Allocation of shared computing resources is an important consideration in such a multi-tenant environment. For example, shared computing resources may need be allocated among the tenants such that no one tenant may monopolize a disproportionate amount of the shared computing resources, as this may negatively impact other tenants. As another example, a service provider may wish to allocate a larger amount of the shared computing resources to a certain tenant without unfairly burdening other tenants.

Traditional approaches to resource allocation in multi-tenant environments have several disadvantages. For example, some traditional approaches, such as rate limiting of tenant access to shared computing resources, may result in an unfair allocation of the shared computing resources among the tenants. Other traditional approaches may designate a predetermined amount of the shared computing resources for each tenant (e.g., each tenant may utilize 10 percent of the shared computing resources). Such approaches may result in poor overall utilization of the shared computing resources, particularly when tenant usage of the service may be highly variable and/or may occur in abrupt bursts. As such, the instant disclosure identifies and addresses a need for improved systems and methods for allocating shared resources in multi-tenant environments.

SUMMARY

As will be described in greater detail below, the instant disclosure describes various systems and methods for allocating shared resources in multi-tenant environments by assigning probability factors to each tenant in a multi-tenant service system, probabilistically selecting one of the tenants using the assigned probability factors, and directing the multi-tenant service system to allocate an available resource of the multi-tenant service system to the selected tenant.

In one example, a computer-implemented method for allocating shared resources in multi-tenant environments may include (1) for each tenant in a plurality of tenants within a multi-tenant service system, assigning a probability factor to the tenant that indicates a likelihood that the tenant will be selected when a resource of the multi-tenant service system is available, (2) detecting that the resource of the multi-tenant service system is available, (3) probabilistically selecting a tenant from the plurality of tenants by using the probability factors assigned to the tenants in the plurality of tenants, and (4) directing the multi-tenant service system to allocate the resource to the selected tenant for execution of a work item received from the selected tenant.

In some embodiments, assigning the probability factor to the tenant may include determining a work value corresponding to the tenant. In such embodiments, determining the work value corresponding to the tenant may be based on a weight factor corresponding to the tenant that indicates an importance of the tenant relative to at least one additional tenant in the plurality of tenants. In some examples, determining the work value corresponding to the tenant may be based on a number of work items in a queue of work items associated with the tenant. In such examples, the queue of work items associated with the tenant may include at least one enqueued work item, and determining the work value corresponding to the tenant may be further based on a cost factor representative of a cost of execution of the enqueued work item.

In some embodiments, determining the work value corresponding to the tenant may include tracking a recency factor corresponding to the tenant that is representative of a number of selections that have been made since the tenant was previously selected. In such embodiments, determining the work value corresponding to the tenant may be based on the tracked recency factor. In some examples, tracking the recency factor corresponding to the tenant may include (1) setting the recency factor corresponding to the tenant to a predetermined value when the tenant is selected, and (2) adding a predetermined amount to the recency factor corresponding to the tenant when a different tenant in the plurality of tenants is selected.

In further examples, assigning the probability factor to the tenant may include determining (1) a sum of a plurality of work values, each work value in the plurality of work values corresponding to a different tenant in the plurality of tenants, and (2) a quotient of the work value corresponding to the tenant divided by the sum of the work values. Such examples may further include designating the quotient as the probability factor corresponding to the tenant.

In some additional embodiments, assigning the probability factor to the tenant may include determining a work value corresponding to the tenant by calculating a product of (1) a weight factor corresponding to the tenant that indicates an importance of the tenant relative to at least one additional tenant in the plurality of tenants, (2) a number of work items in a queue of work items associated with the tenant, and (3) a recency factor corresponding to the tenant that is representative of a number of selections that have been made since the tenant was previously selected. Such embodiments may additionally include designating the calculated product as the work value corresponding to the tenant. In some examples, assigning the probability factor to the tenant may further include determining a total of a plurality of work values, each work value in the plurality of work values corresponding to a different tenant in the plurality of tenants. In such examples, assigning the probability factor to the tenant may be further based on the work value corresponding to the tenant and the total of the plurality of work values.

In some embodiments, the resource of the multi-tenant service system may include a worker of the multi-tenant service system that is configured to process a task associated with the work item.

In addition, a corresponding system for allocating shared resources in multi-tenant environments may include several modules stored in memory, including (1) an assigning module that, for each tenant in a plurality of tenants within a multi-tenant service system, assigns a probability factor to the tenant that indicates a likelihood that the tenant will be selected when a resource of the multi-tenant service system is available, (2) a detecting module that detects that the resource of the multi-tenant service system is available, (3) a selecting module that probabilistically selects a tenant from the plurality of tenants by using the probability factors assigned to the tenants in the plurality of tenants, and (4) a directing module that directs the multi-tenant service system to allocate the resource to the selected tenant for execution of a work item received from the selected tenant. The system may further include at least one physical processor that executes the assigning module, the detecting module, the selecting module, and the directing module.

In some embodiments, assigning the probability factor to the tenant may include determining a work value corresponding to the tenant. In such embodiments, determining the work value corresponding to the tenant may be based on a weight factor corresponding to the tenant that indicates an importance of the tenant relative to at least one additional tenant in the plurality of tenants. In some examples, determining the work value corresponding to the tenant may be based on a number of work items in a queue of work items associated with the tenant. In some such examples, the queue of work items associated with the tenant may include at least one enqueued work item, and determining the work value corresponding to the tenant may be further based on a cost factor representative of a cost of execution of the enqueued work item.

In some examples, determining the work value corresponding to the tenant may include tracking a recency factor corresponding to the tenant that is representative of a number of selections that have been made since the tenant was previously selected. In such embodiments, determining the work value corresponding to the tenant is based on the tracked recency factor. In some examples, tracking the recency factor corresponding to the tenant may include (1) setting the recency factor corresponding to the tenant to a predetermined value when the tenant is selected, and (2) adding a predetermined amount to the recency factor corresponding to the tenant when a different tenant in the plurality of tenants is selected.

In further examples, assigning the probability factor to the tenant may include determining (1) a sum of a plurality of work values, each work value in the plurality of work values corresponding to a different tenant in the plurality of tenants, and (2) a quotient of the work value corresponding to the tenant divided by the sum of the work values. Such examples may further include designating the quotient as the probability factor corresponding to the tenant.

In some examples, the above-described method may be encoded as computer-readable instructions on a computer-readable medium. For example, a computer-readable medium may include one or more computer-executable instructions that, when executed by at least one processor of a computing device, may cause the computing device to (1) for each tenant in a plurality of tenants within a multi-tenant service system, assign a probability factor to the tenant that indicates a likelihood that the tenant will be selected when a resource of the multi-tenant service system is available, (2) detect that the resource of the multi-tenant service system is available, (3) probabilistically select a tenant from the plurality of tenants by using the probability factors assigned to the tenants in the plurality of tenants, and (4) direct the multi-tenant service system to allocate the resource to the selected tenant for execution of a work item received from the selected tenant.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
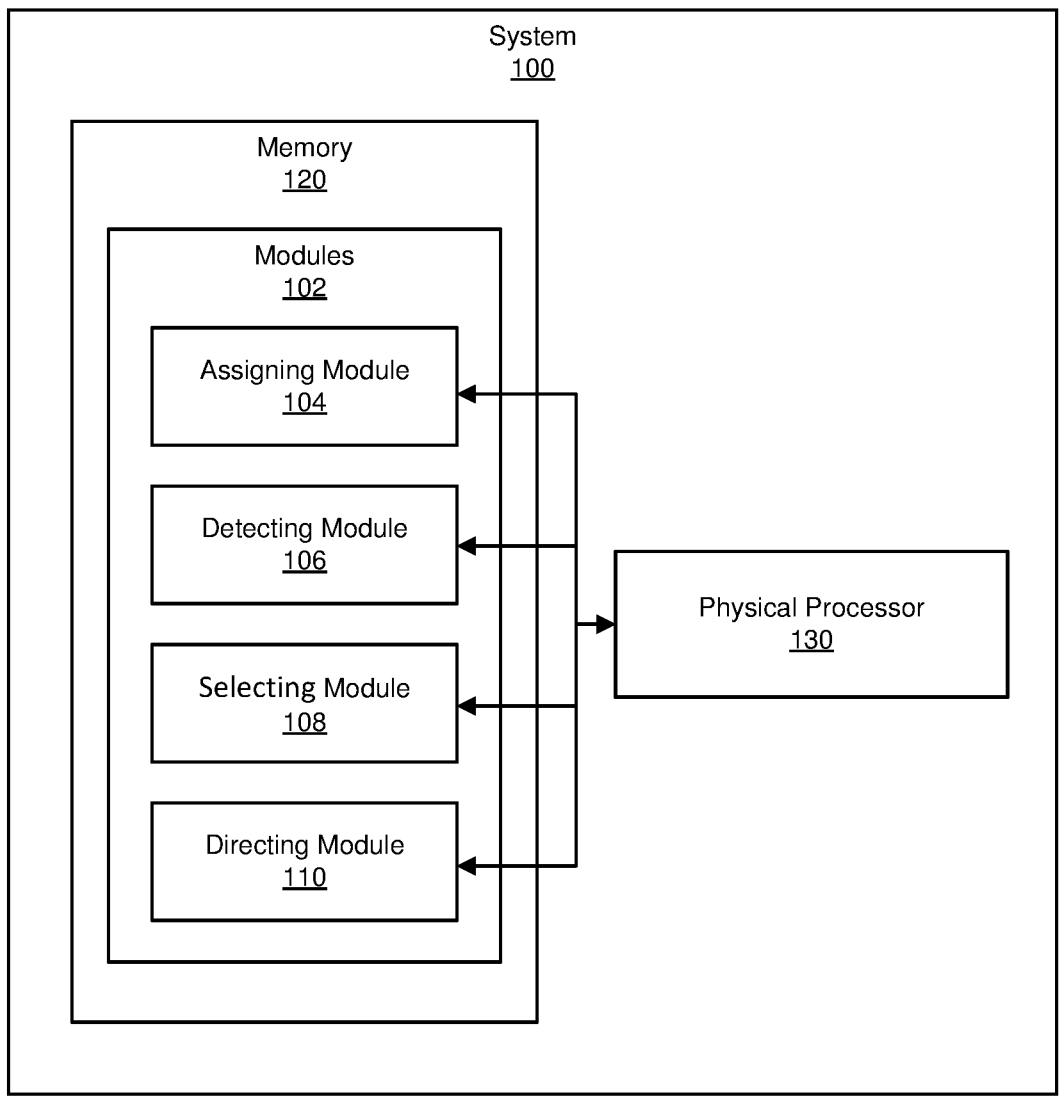
FIG. 1 is a block diagram of an example system for allocating shared resources in multi-tenant environments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for allocating shared resources in multi-tenant environments. As will be explained in greater detail below, embodiments of the instant disclosure may assign a probability factor to each tenant in a multi-tenant service system that indicates a likelihood that the tenant will be selected when a resource (e.g., a worker) of the multi-tenant service is available (e.g., when a worker of the multi-tenant service system is available to execute a work item). Additionally, embodiments of the instant disclosure may also detect that the resource is available and may probabilistically select a tenant from among the multiple tenants by using the probability factors assigned to the tenants. Furthermore, embodiments of the instant disclosure may then direct the multi-tenant service system to allocate the available resource (e.g., the available worker) to the selected tenant for execution of a work item received from the selected tenant.

Embodiments of the instant disclosure may facilitate a probabilistically fair allocation of resources among tenants in a multi-tenant service system. The systems and methods described herein may also enable administrators of multi-tenant service systems to prioritize completing work items for more important tenants without unfairly disadvantaging less important tenants. Additionally, embodiments of the instant disclosure may efficiently allocate shared computing resources among multiple tenants, and may thus improve overall utilization of shared computing resources of a multi-tenant service system. Other benefits and advantages of the systems and methods described herein will be made apparent by the description below.

The following will provide, with reference to FIGS. 1-2 and 4-6, detailed descriptions of systems for allocating shared resources in multi-tenant environments. Detailed descriptions of corresponding computer-implemented methods will also be provided in connection with FIG. 3.

FIG. 1 is a block diagram of an example system 100 for allocating shared resources in multi-tenant environments. As illustrated in this figure, example system 100 may include one or more modules 102 for performing one or more tasks. As will be explained in greater detail below, modules 102 may include an assigning module 104 that, for each tenant in a plurality of tenants within a multi-tenant service system, assigns a probability factor to the tenant that indicates a likelihood that the tenant will be selected when a resource of the multi-tenant service system is available.

Example system 100 may additionally include a detecting module 106 that detects that the resource of the multi-tenant service system is available. Example system 100 may also include a selecting module 108 that probabilistically selects a tenant from the plurality of tenants by using the probability factors assigned to the tenants in the plurality of tenants. In addition, example system 100 may also include a directing module 110 that directs the multi-tenant service system to allocate the resource to the selected tenant for execution of a work item received from the selected tenant.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate allocating shared resources in multi-tenant environments. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
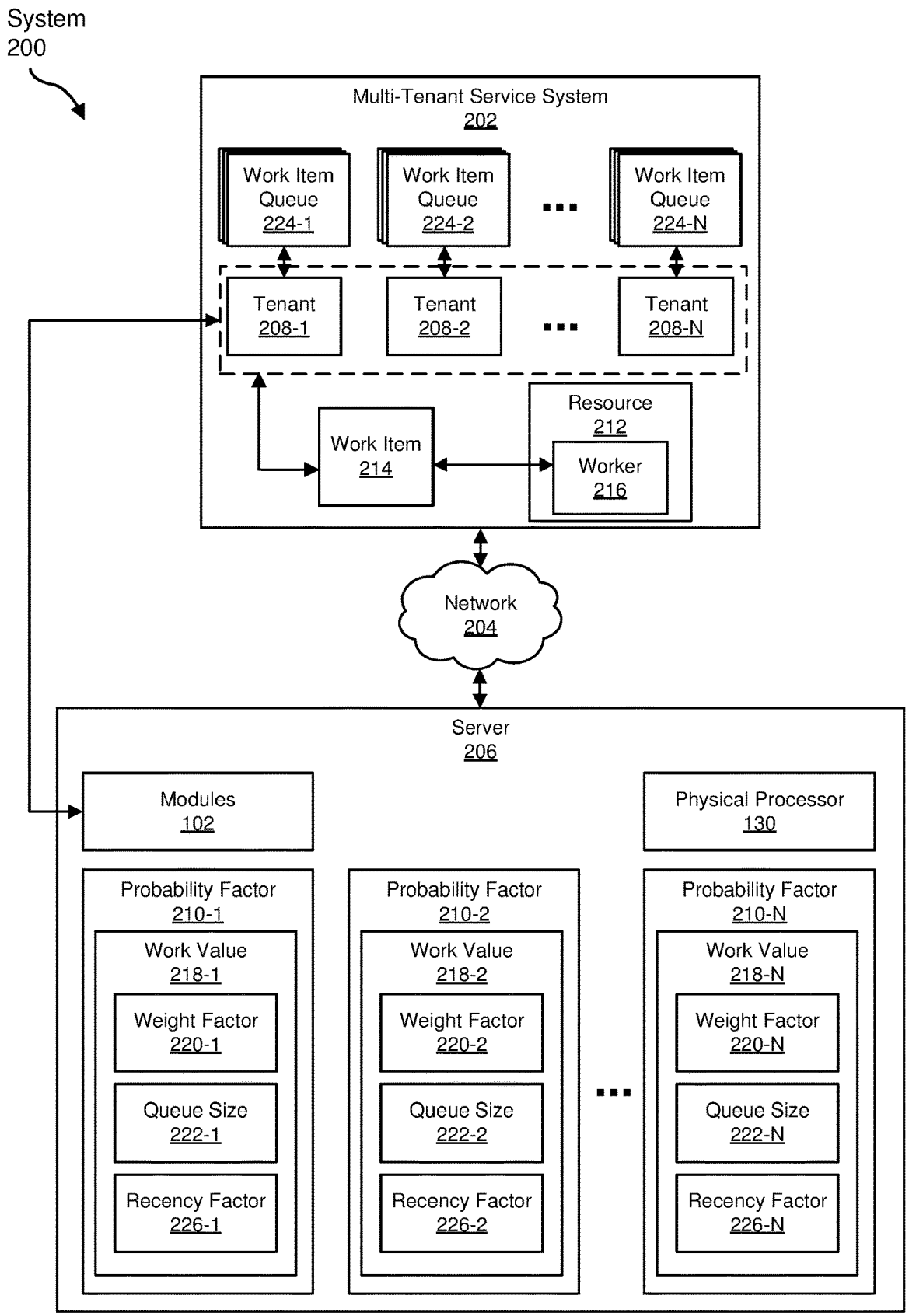
FIG. 2 is a block diagram of an example implementation of a system for allocating shared resources in multi-tenant environments.

Example system 100 in FIG. 1 may be implemented in a variety of ways. For example, all or a portion of example system 100 may represent portions of an example system 200 ("system 200") in FIG. 2. As shown in FIG. 2, system 200 may include a multi-tenant service system 202 in communication with a server 206 via network 204. In at least one example, server 206 may be programmed with one or more of modules 102. Additionally or alternatively, although not shown in FIG. 2, multi-tenant server system 202 may be programmed with one or more of modules 102.

In at least one embodiment, one or more modules 102 from FIG. 1 may, when executed by multi-tenant service system 202 and/or server 206, enable multi-tenant service system 202 and/or server 206 to perform one or more operations to allocate shared resources in multi-tenant environments. For example, as will be described in greater detail below, assigning module 104 may cause multi-tenant service system 202 and/or server 206 to, for each tenant (e.g., each of tenant 208-1 to 208-N) in a plurality of tenants (e.g., tenants 208) within a multi-tenant service system (e.g., multi-tenant service system 202), assign a probability factor to the tenant (e.g., a probability factor 210-1 to 210-N) that indicates a likelihood that the tenant will be selected when a resource of the multi-tenant service system (e.g., resource 212) is available.

Furthermore, detecting module 106 may cause multi-tenant service system 202 and/or server 206 to detect that the resource (e.g., resource 212) of a multi-tenant service system (e.g., multi-tenant service system 202) is available. Selecting module 108 may cause multi-tenant service system 202 and/or server 206 to probabilistically select a tenant (e.g., at least one of tenants 208-1 to 208-N) from the plurality of tenants (e.g., tenants 208) by using the probability factors (e.g., probability factors 210-1 to 210-N) assigned to the tenants in the plurality of tenants. Directing module 110 may cause multi-tenant service system 202 and/or server 206 to direct the multi-tenant service system (e.g., multi-tenant service system 202) to allocate the resource to the selected tenant for execution of a work item (e.g., work item 214) received from the selected tenant. In some embodiments, the resource of the multi-tenant service system may include a worker (e.g., worker 216) of the multi-tenant service system that is configured to process a task associated with the work item (e.g., work item 214).

In some embodiments, assigning module 104 may cause multi-tenant service system 202 and/or server 206 to assign a probability factor to a tenant by determining a work value corresponding to the tenant (e.g., a work value 218-1 to 218-N). In such embodiments, determining the work value corresponding to the tenant may be based on a weight factor corresponding to the tenant (e.g., a weight factor 220-1 to 220-N) that indicates an importance of the tenant relative to at least one additional tenant in the plurality of tenants. In some examples, determining the work value corresponding to the tenant may be based on a number of work items (e.g., a queue size 222-1 to 222-N) in a queue of work items (e.g., a work item queue 224-1 to 224-N) associated with the tenant. In such examples, the queue of work items associated with the tenant may include at least one enqueued work item, and determining the work value corresponding to the tenant may be further based on a cost factor representative of a cost of execution of the enqueued work item.

In some examples, determining the work value corresponding to the tenant may include tracking a recency factor corresponding to the tenant (e.g., a recency factor 226-1 to 226-N) that is representative of a number of selections that have been made since the tenant was previously selected. In such embodiments, determining the work value corresponding to the tenant may be based on the tracked recency factor. Various ways that modules 102 may cause multi-tenant service system 202 and/or server 206 to accomplish the above operations will be described below in reference to FIG. 3.

Multi-tenant service system 202 generally represents any type or form of computing device capable of reading computer-executable instructions and/or hosting executables and communicating with server 206 via network 204. In at least one embodiment, multi-tenant service system 202 may accept one or more directions from server 206. As shown, multi-tenant service system 202 may facilitate multiple tenants 208 performing one or more computing actions via at least one shared resource 212. Multi-tenant service system 202 may include any suitable number of tenants 208. Examples of server 206 include, without limitation, application servers, storage servers, database servers, web servers, and/or any other suitable computing device configured to run certain software applications and/or provide various testing, web, storage, and/or database services.

As a brief illustration, multi-tenant service system 202 may include two tenants: tenant 208-1 and tenant 208-2. For the purposes of this illustration, multi-tenant service system 202 may also be configured to evaluate a quality level of a web site using shared resource 212 (e.g., worker 216). A first user may enqueue a first set of uniform resource locators (URLs) that correspond to a first set of web sites as work items in work item queue 224-1 associated with tenant 208-1. A second user may also enqueue a second set of URLs that correspond to a second set of web sites as work items in work item queue 224-2 associated with tenant 208-2. Modules 102 may cause server 206 to assign (e.g., via assigning module 104) a probability value to each of tenants 208, detect (e.g., via detecting module 106) that resource 212 is available, probabilistically select (e.g., via selecting module 108) tenant 208-1 from tenants 208, and direct (e.g., via directing module 110) multi-tenant service system 202 to allocate resource 212 to tenant 208-1 for execution of a work item received from tenant 208-1. This may cause multi-tenant service system 202 to execute a work item (e.g., evaluate a URL) from work item queue 224-1 using resource 212.

When resource 212 is again available, modules 102 may cause server 206 to again assign (e.g., via assigning module 104) a probability value to each of tenants 208, detect that resource 212 is available, probabilistically select tenant 208-2 from tenants 208, and direct multi-tenant service system 202 to allocate resource 212 to tenant 208-2 for execution of a work item received from tenant 208-2. This process may continue until all work items in all work item queues 224 have been executed.

Network 204 generally represents any medium or architecture capable of facilitating communication and/or data transfer between multi-tenant service system 202 and server 206. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, APPLE LIGHTNING connections, and the like. Network 204 may facilitate communication or data transfer using wireless or wired connections. In one embodiment, network 204 may facilitate communication between multi-tenant service system 202 and server 206.

Server 206 generally represents any type or form of computing device capable of reading computer-executable instructions and/or hosting executables. Examples of server 206 include, without limitation, application servers, storage servers, database servers, web servers, and/or any other suitable computing device configured to run certain software applications and/or provide various testing, web, storage, and/or database services.

In at least one example, multi-tenant service system 202 and server 206 may be computing devices programmed with one or more of modules 102. All or a portion of the functionality of modules 102 may be performed by multi-tenant service system 202, server 206 and/or any other suitable computing system. As will be described in greater detail below, one or more of modules 102 from FIG. 1 may, when executed by at least one processor of server 206, enable server 206 to allocate shared resources in multi-tenant environments.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
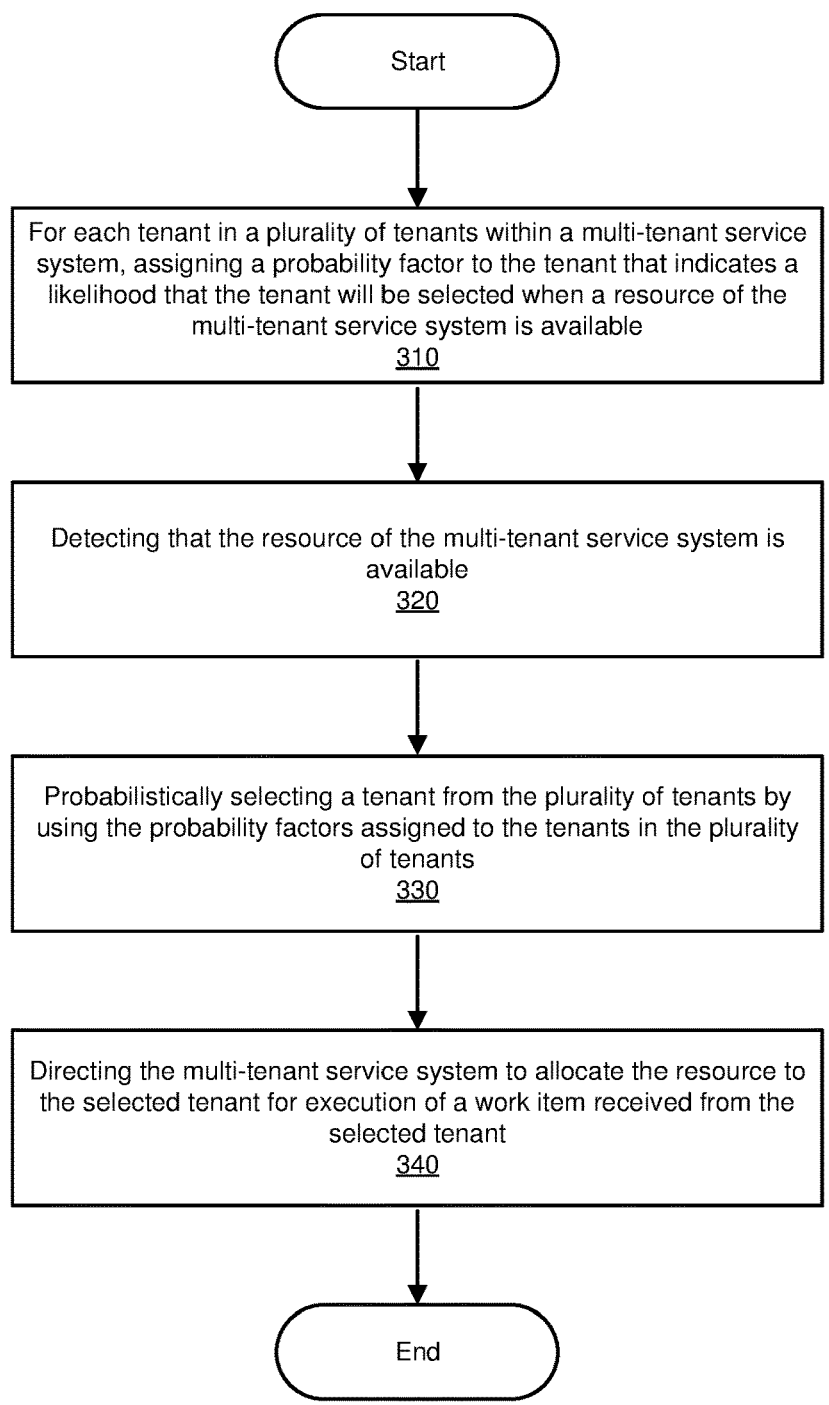
FIG. 3 is a flow diagram of an example method for allocating shared resources in multi-tenant environments.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at operation 310, one or more of the systems described herein may, for each tenant in a plurality of tenants within a multi-tenant service system, assign a probability factor to the tenant that indicates a likelihood that the tenant will be selected when a resource of the multi-tenant service system is available. For example, assigning module 104 may, for each tenant 208-1 to 208-N in tenants 208 within multi-tenant service system 202, assign a probability factor to the tenant that indicates a likelihood that the tenant will be selected when resource 212 (e.g., worker 216) of multi-tenant service system 202 is available.

The term "tenant" may, in some examples, refer to an independent instance of one or more applications, virtual computing environments, and/or processes operating in a shared computing environment. In some examples, each tenant in a shared computing environment (e.g., multi-tenant service system 202) may be logically isolated from other tenants operating within the shared computing environment but may compete with the other tenants for shared computing resources (e.g., physical, logical, real, and/or virtual computing resources). In some examples, a tenant may be associated with, without limitation, a user, an agent, an organization, a computing device, an application, a group and/or a combination of one or more of the same, and so forth.

The term "resource" may, in some examples, refer to any physical, logical, real, and/or virtual resource of a multi-tenant service system including, without limitation, a processing resource, a storage resource, a memory resource, a network resource, and so forth. In some embodiments, a resource of a multi-tenant service system (e.g., multi-tenant service system 202) may include a worker (e.g., worker 216). The term "worker" may, in some examples, refer to any resource or set of resources of a multi-tenant service system that may be configured to process a task associated with a work item.

The term "work item" may, in some examples, refer to a specific task or set of tasks that a multi-tenant service system (e.g., multi-tenant service system 202) may be configured to perform. A work item may be queued for execution by the multi-tenant service system in a queue of work items (e.g., one of work item queues 224) associated with a tenant in the multi-tenant service system. Additionally, though not shown in FIG. 2, each of work item queues 224 may be fed by a corresponding global work item queue that may also include one or more work items associated with one or more of tenants 208. Thus, at any suitable time, a set of work items may be transferred to a work item queue 224 from a corresponding global work item queue.

The term "probability factor" may, in some examples, refer to any value that may indicate a probability of an event occurring. In some examples, a probability factor may be any number greater than or equal to zero and less than or equal to one, with zero indicating no likelihood of an event occurring, and one indicating a certainty of the event occurring. For example, a probability factor of 0.50 may indicate a 50% chance of an event occurring. A probability factor assigned to a tenant may indicate a likelihood that the tenant may be selected (e.g., by selecting module 108) when a resource of a multi-tenant service system (e.g., resource 212, worker 216, etc.) becomes available. For example, if assigning module 104 assigns a probability factor 210-1 with a value of 0.25 to tenant 208-1 and detecting module 106 detects that resource 212 (e.g., worker 216) is available (e.g., to execute a work item), there may be a 25% chance of selecting module 108 probabilistically selecting tenant 208-1.

Figure 4:
FIG. 4 illustrates various ways of assigning a probability factor to a tenant.

FIG. 4 shows a chart 400 that illustrates some examples of probability factors 210 assigned to corresponding tenants 208. As shown, chart 400 includes tables 402 to 408. Each of tables 402 to 408 include a "Tenants 208" row that includes three columns indicating three tenants 208: tenant 208-1 ("1"), tenant 208-2 ("2"), and tenant 208-3 ("3"). This may indicate that, in the examples illustrated in FIG. 4, multi-tenant service system 202 includes three tenants. Each of tables 402 to 408 also include a "Probability Factors 210" row, with probability factors 210 corresponding to each tenant in the "Tenant" row (e.g., probability factor 210-1 corresponding to tenant 208-1, probability factor 210-2 corresponding to tenant 208-2, etc.).

Table 402 shows probability factors 210-1 to 210-3 with respective values of 0.25, 0.25, and 0.50 assigned to corresponding tenants 208-1 to 208-3. The probability factors 210 shown in table 402 may indicate that, when detecting module 106 detects that resource 212 is available, selecting module 108 may have a 25% likelihood of selecting tenant 208-1, a 25% likelihood of selecting tenant 208-2, and a 50% likelihood of selecting tenant 208-3. The probability factors in table 402 may also indicate that selecting module 108 may be twice as likely to select tenant 208-3 than tenant 208-1 or tenant 208-2.

Table 404 shows probability factors 210-1 to 210-3 with respective values of 0.33, 0.33, and 0.33 assigned to corresponding tenants 208-1 to 208-3. The probability factors 210 shown in table 404 may indicate that, when detecting module 106 detects that resource 212 is available, selecting module 108 may have a 33% likelihood of selecting tenant 208-1, a 33% likelihood of selecting tenant 208-2, and a 33% likelihood of selecting tenant 208-3. The probability factors in table 404 may also indicate that selecting module 108 may be equally likely to select tenant 208-1, tenant 208-2, or tenant 208-3.

Table 406 shows probability factors 210-1 to 210-3 with respective values of 0.40, 0.20, and 0.40 assigned to corresponding tenants 208-1 to 208-3. Probability factors 210 shown in table 406 may indicate that, when detecting module 106 detects that resource 212 is available, selecting module 108 may have a 40% likelihood of selecting tenant 208-1, a 20% likelihood of selecting tenant 208-2, and a 40% likelihood of selecting tenant 208-3. The probability factors in table 406 may also indicate that selecting module 108 is twice as likely to select tenant 208-1 or 208-3 than 208-2.

Table 408 shows probability factors 210-1 to 210-3 with respective values of 0.50, 0.50, and 0.00 assigned to corresponding tenants 208-1 to 208-3. The probability factors 210 shown in table 408 may indicate that, when detecting module 106 detects that resource 212 is available, selecting module 108 may have a 50% likelihood of selecting tenant 208-1, a 50% likelihood of selecting tenant 208-2, and a 0.00% likelihood of selecting tenant 208-3. Thus, the probability factors in table 408 may indicate that selecting module 108 may be equally as likely to select tenant 208-1 as tenant 208-2, and that selecting module 108 may not select 208-3.

Assigning module 104 may assign a probability factor to a tenant in a variety of ways and contexts. For example, assigning module 104 may determine a work value corresponding to the tenant. A work value (e.g., each of work values 218-1 to 218-N) may represent a value of a corresponding tenant (e.g., one of tenants 208-1 to 208-N) in a multi-tenant service system (e.g., multi-tenant service system 202). Assigning module 104 may then use the work value corresponding to the tenant in various ways to assign a probability factor to the tenant, as will be described below.

Assigning module 104 may determine a work value for a tenant based on a variety of factors. For example, assigning module 104 may determine a work value that corresponds to a tenant based on a weight factor (e.g., a weight factor 220-1 to 220-N) corresponding to the tenant. A weight factor corresponding to a tenant may indicate an importance of the tenant relative to at least one additional tenant in the multi-tenant service system.

By way of illustration, in a multi-tenant service system 202 with two tenants, tenant 208-1 may have a corresponding weight factor 220-1 of 1, and tenant 208-2 may have a corresponding weight factor 220-2 of 2. These weight factors may indicate that tenant 208-2 is twice as important as tenant 208-1.

Continuing with this illustration, assigning module 104 may, based on weight factor 220-1 having a value of 1 and weight factor 220-2 having a value of 2, determine a value for work value 218-1 of 1 and a value for work value 218-2 of 2. Assigning module 104 may then determine, based on work value 218-1, a value of 0.33 for probability factor 210-1, and a value of 0.66 for probability factor 210-2. Assigning module 104 may then assign these determined probability factors to tenant 208-1 and tenant 208-2, respectively. These probability factors may indicate that selecting module 108 may be twice as likely to select tenant 208-2 as tenant 208-1 when resource 212 becomes available. Additional examples will be described and illustrated below in relation to FIGS. 5 and 6.

In some embodiments, assigning module 104 may determine a work value that corresponds to a tenant based on a number of work items (e.g., a queue size 222-1 to 222-N) in a queue of work items (e.g., a work item queue 224-1 to 224-N) associated with the tenant. This may cause selecting module 108 to favor selecting tenants having longer queues, or favor selecting tenants having more work items available for multi-tenant service system 202 to execute and/or perform. For example, tenant 208-1 may be associated with work item queue 224-1. Work item queue 224-1 may include 3 work items. Thus, work item queue 224-1 may have a corresponding queue size 222-1 of 3. Assigning module 104 may therefore determine, based on queue size 222-1 having a value of 3, a work value 218-1 corresponding to tenant 208-1 of 3. Additional examples will be described and illustrated below in relation to FIGS. 5 and 6.

In some examples, assigning module 104 may determine a work value corresponding to a tenant by tracking a recency factor corresponding to the tenant. A recency factor corresponding to a tenant may be representative of a number of selections that selecting module 108 has made since previously selecting the tenant. Assigning module 104 may then determine the work value corresponding to the tenant based on the tracked recency factor.

For example, in a multi-tenant service system 202 with two tenants, tenant 208-1 may have a corresponding recency factor 226-1 of 1.00. If, when resource 212 is available, selecting module 108 selects tenant 208-2, assigning module 104 may add a predetermined amount to recency factor 226-1. For example, assigning module 104 may add 0.01 to recency factor 226-1, giving recency factor 226-1 a value of 1.01. Assigning module 104 may then determine, based on recency factor 226-1 having a value of 1.01, a work value 218-1 corresponding to tenant 208-1 of 1.01. When resource 212 is next available, selecting module 108 may select tenant 208-1, and assigning module 104 may set recency factor 226-1 to a predetermined value, such as 1.00. Assigning module 104 may then determine, based on recency factor 226-1 having a value of 1.00, a work value 218-1 corresponding to tenant 208-1 of 1.00. Additional examples will be described and illustrated below in relation to FIGS. 5 and 6.

In some examples, assigning module 104 may determine a work value that corresponds to a tenant based on any other suitable factor. For example, a work item queue (e.g., work item queue 224-1) associated with a tenant (e.g., tenant 208-1) may include at least one enqueued work item. That enqueued work item may have a particular cost of execution. For example, the enqueued work item may require a known or anticipated amount of time, computing resources, etc. to execute. The enqueued work item may have an associated cost factor that is representative of the cost of execution of the enqueued work item. Assigning module may therefore determine a value for work value 218-1 based on the cost factor that is representative of the cost of execution of an enqueued work item.

Additionally, in some embodiments, assigning module 104 may determine a work value that corresponds to a tenant (e.g., one of tenants 208-1 to 208-N) based on any combination of factors, including, without limitation, weight factors 220, queue sizes 222, recency factors 226 corresponding to the tenant, and/or cost factors representative of costs of execution of enqueued work items. For example, assigning module 104 may determine work value 218-1 that corresponds to tenant 208-1 based on a combination of weight factor 220-1, queue size 222-1, and/or recency factor 226-1.

The above factors may be combined in accordance with any suitable method of combination. For instance, assigning module 104 may determine a work value that corresponds to a tenant by multiplying a corresponding weight factor by a corresponding queue size and a corresponding recency factor. The combination may therefore be in accordance with the statement $W(t)=w(t) \times c(t) \times r(t)$, where $W(t)$ represents the work value corresponding to the tenant, $w(t)$ represents the weight factor corresponding to the tenant, $c(t)$ represents the queue size corresponding to the tenant, and $r(t)$ represents the recency factor corresponding to the tenant.

By way of illustration, in one example, tenant 208-1 may have a corresponding weight factor 220-1 with a value of 2, a corresponding queue size 222-1 with a value of 1, and a corresponding recency factor 226-1 with a value of 1.00. Assigning module 104 may therefore determine a value of 2 for work value 218-1 (i.e., $2=1\times1\times1.00$).

In some examples, assigning module 104 may assign a probability factor to a tenant by determining a sum of work values corresponding to all the tenants in a multi-tenant service system, determining a quotient of the work value of the tenant divided by the determined sum, and designating the determined quotient as the probability factor corresponding to the tenant. For example, multi-tenant service system 202 may include three tenants: tenant 208-1, tenant 208-2, and tenant 208-3. Assigning module 104 may determine that work value 218-1 corresponding to tenant 208-1 has a value of 1, work value 218-2 corresponding to tenant 208-2 has a value of 3, and work value 218-3 corresponding to tenant 208-3 has a value of 6. Assigning module 104 may determine a sum of all work values corresponding to all the tenants in multi-tenant service system 202 of 10 (i.e., $10=1+3+6$). Assigning module 104 may then determine a quotient of work value 218-1 divided by the determined sum. In this example, the quotient may be 0.10 (i.e., $\frac{1}{10}=0.10$). Assigning module 104 may then assign the quotient 0.10 as the value of probability factor 210-1. Continuing with this example, the foregoing process may also result in assigning module 104 assigning a value of 0.30 to probability factor 210-2 and a value of 0.60 to probability factor 210-3 corresponding to tenant 208-3.

Figure 5:
FIG. 5 illustrates various examples of determining work values corresponding to tenants based on various factors, as well as ways of assigning probability factors to corresponding tenants based on determined work values.

FIG. 5 shows a chart 500 that illustrates some examples of ways assigning module 104 may determine work values 218 based on corresponding weight factors 220, queue sizes 222, and recency factors 226. Chart 500 may also illustrate ways assigning module 104 may assign probability factors 210 to corresponding tenants 208 based on determined work values 218. As shown, chart 500 includes tables 502 to 506. Each of table 502 to 506 may illustrate a different possible configuration of some of the elements of server 206 shown in FIG. 2. Each of tables 502 to 506 include a "Tenants 208" row that includes six columns indicating six tenants 208: tenant 208-1 ("1"), tenant 208-2 ("2"), tenant 208-3 ("3"), tenant 208-4 ("4"), tenant 208-5 ("5"), and tenant 208-6 ("6"). This may indicate that, in the examples illustrated in FIG. 5, multi-tenant service system 202 includes six tenants.

Each of tables 502 to 506 also include a "Probability Factors 210" row, with probability factors 210 corresponding to each tenant in the "Tenant 208" row (e.g., probability factor 210-1 corresponding to tenant 208-1, probability factor 210-2 corresponding to tenant 208-2, etc.). Each of tables 502 to 506 also include a "Work Values 218" row indicating work values 218 corresponding to each tenant (e.g., work value 218-1 corresponding to tenant 208-1, work value 218-2 corresponding to tenant 208-2, etc.). Each of tables 502 to 506 similarly include a "Weight Factors 220" row, a "Queue Sizes 222" row, and a "Recency Factors 226"

row with one of weight factors 220, one of queue sizes 222, and one of recency factors 226 corresponding to each of tenants 208, respectively. Furthermore, all of recency factors 226 in FIG. 5 have the same value of 1.

In the example illustrated in table 502, tenants 208-1 to 208-6 all have corresponding weight factors 220 with the same value of 1. This may indicate that all of tenants 208-1 to 208-6 have the same importance relative to each other. Furthermore, queue size 222-1 and queue size 222-2 have the same value of 1. This may indicate that both work item queue 224-1 and work item queue 224-2 contain one work item each. The other work item queues (e.g., work item queues 224-3 to 224-6) have values of 0, which may indicate that corresponding tenants 208-3 to 208-6 have no work items available for multi-tenant service system 202 to execute.

As described above, assigning module 104 may determine work values 218 in accordance with $W(t)=w(t) \times c(t) \times r(t)$, where W(t) represents the work value 218 of the tenant, w(t) represents the weight factor 220 corresponding to the tenant, c(t) represents the queue size 222 corresponding to the tenant, and r(t) represents the recency factor 226 corresponding to the tenant. Thus, for the example shown in table 502, assigning module 104 may determine a value of 1 for work value 218-1 and a value of 1 for work value 218-2. Assigning module 104 may likewise determine that work values 218-3 to 218-6 have values of 0 (i.e., 0=1×0×1).

As described above, assigning module 104 may assign a probability factor 210 to a tenant 208 by determining a sum of work values 218 (shown in tables 502 to 506 in a cell of each table labeled "Total Work Value"), dividing the work value of the tenant (i.e., W(t)) by the determined sum, and then designating the quotient as the probability factor corresponding to the tenant. For instance, in the example illustrated in table 502, assigning module 104 may determine a sum of work values 218 of 2 (i.e., 2=1+1+0+0+0). Assigning module 104 may then determine probability factor 210-1 by dividing work value 218-1 (i.e., 1) by 2. This may yield a quotient of 0.500, which assigning module 104 may designate as probability factor 210-1. Furthermore, assigning module 104 may also determine probability factor 210-2 by dividing work value of 218-2 (i.e., 1) by 2. This also yields a quotient of 0.500, which assigning module 104 may designate as probability factor 210-1. As all the other tenants (i.e., tenants 208-3 to 208-6) have work values of 0, assigning module 104 may assign them probability factors of 0.000.

In the example shown in table 502, tenant 208-1 and tenant 208-2 have the same assigned probability factors (i.e., 0.500), whereas the remaining tenants 208-3 to 208-6 have assigned probability factors of 0.000. Thus, when detecting module 106 detects that resource 212 (e.g., worker 216) is available, selecting module 108 may have a 50% likelihood of selecting tenant 208-1, a 50% likelihood of selecting tenant 208-2, and a 0% likelihood of selecting any of tenants 208-3 to 208-6.

In the example illustrated in table 504, tenant 208-1 has a corresponding weight factor 220-1 of 3, and tenants 208-2 to 208-6 each have corresponding weight factors 220 of 1. This may indicate that tenant 208-1 is three times as important as any one of tenant 208-2 to tenant 208-6. Furthermore, queue sizes 222-1 to 222-3 have the same value of 1, while queue sizes 222-4 to 222-6 have the same value of 0. This may indicate that work item queues 224-1 to 224-3 include one work item each, while work item queues 224-3 to 224-6 have no work items available for multi-tenant service system 202 to execute.

Assigning module 104 may again determine work values 218 in accordance with $W(t)=w(t) \times c(t) \times r(t)$. Thus, for the example shown in table 504, assigning module 104 may determine a value of 3 for work value 218-1, a value of 1 for work value 218-2 and work value 218-3. Assigning module 104 may likewise determine that work values 218-3 to 218-6 have values of 0.

Continuing with the example shown in table 504, assigning module 104 may again determine a sum of work values 218 of 5. Assigning module 104 may then determine probability factor 210-1 by dividing the work value 218-1 (i.e., 3) by 5. This may yield a value of 0.600, which assigning module 104 may designate as probability factor 210-1. Furthermore, assigning module 104 may also determine probability factor 210-2 by dividing work value 218-2 (i.e., 1) by 5. This may yield a value of 0.200, which assigning module 104 may designate as probability factor 210-2. Assigning module 104 may also determine probability factor 210-3 by dividing the work value 218-3 (i.e., 1) by 5. This may also yield a value of 0.200, which assigning module 104 may designate as probability factor 210-3.

Hence, in the example shown in table 504, tenant 208-1 has an assigned probability factor 210-1 of 0.600, while tenants 208-2 and 208-3 have the same assigned probability factor of 0.200. The remaining tenants 208-4 to 208-6 have assigned probability factors of 0.000. Thus, when detecting module 106 detects that resource 212 (e.g., worker 216) is available, selecting module 108 may have a 60% likelihood of selecting tenant 208-1, a 20% likelihood of selecting tenant 208-2, a 20% likelihood of selecting tenant 208-3, and a 0% likelihood of selecting any of tenants 208-4 to 208-6.

In the example illustrated in table 506, weight factors 220 corresponding to respective tenants 208 are 1, 2, 1, 3, 2, and 3. These weight factors may indicate that tenant 208-2 and tenant 208-5 are twice as important as tenant 208-1 and tenant 208-3, while tenant 208-4 and tenant 208-6 are three times as important as tenant 208-1 and tenant 208-3.

Furthermore, in table 506, queue size 222-1 and queue sizes 222-3 to 222-6 are all 1, which may indicate that their respective work item queues 224 contain one work item each. Queue size 222-2 is 0, which may indicate that work item queue 224-2 is empty.

Assigning module 104 may again determine work values 218 in accordance with $W(t)=w(t) \times c(t) \times r(t)$. Thus, for the example shown in table 506, assigning module 104 may determine a value of 1 for work value 218-1, a value of 0 for work value 218-2, a value of 1 for work value 218-3, a value of 3 for work value 218-4, a value of 2 for work value 218-5, and a value of 3 for work value 218-6.

Continuing with the example shown in table 506, assigning module 104 may again assign probability factors 210 to tenants 208 by determining a sum of work values 218 of 10, and dividing each of work values 218 by the determined sum. This may result in a probability factor 210-1 of 0.100, a probability factor 210-2 of 0.000, a probability factor 210-3 of 0.100, a probability factor 210-4 of 0.300, a probability factor 210-5 of 0.200, and a probability factor 210-6 of 0.300. Thus, when detecting module 106 detects that resource 212 (e.g., worker 216) is available, selecting module 108 may have a 10% likelihood of selecting tenant 208-1, a 0% likelihood of selecting tenant 208-2, a 10% likelihood of selecting tenant 208-3, a 30% likelihood of selecting tenant 208-4, a 20% likelihood of selecting tenant 208-5, and a 30% likelihood of selecting tenant 208-6.

Figure 6:
FIG. 6 illustrates an example of updating probability factor assignments across multiple tenant selections.

Assigning module 104 may additionally re-assign probability factors to tenants 208 following a selection of a tenant by selecting module 108. FIG. 6 shows a chart 600 that illustrates an example of re-assigning probability factors to tenants 208 after one of the tenants is selected to perform a work item. As shown, chart 600 includes table 602 that illustrates a particular state (e.g., a condition at a particular point in time) of elements included in system 200 (e.g., multi-tenant service system 202 and/or server 206). Like tables 502 through 508, table 602 includes a "Tenants 208" row that includes six columns indicating six tenants 208: tenant 208-1 ("1"), tenant 208-2 ("2"), tenant 208-3 ("3"), tenant 208-4 ("4"), tenant 208-5 ("5"), and tenant 208-6 ("6"). This may indicate that, as in the examples illustrated in FIG. 5, for the example illustrated in FIG. 6, multi-tenant service system 202 also includes six tenants.

Also like tables 502 through 508, table 602 includes a "Probability Factors 210" row, with probability factors 210 corresponding to each tenant in the "Tenant 208" row (e.g., probability factor 210-1 corresponding to tenant 208-1, probability factor 210-2 corresponding to tenant 208-2, etc.). Table 602 also includes a "Work Values 218" row indicating one of work values 218 corresponding to each tenant (e.g., work value 218-1 corresponding to tenant 208-1, work value 218-2 corresponding to tenant 208-2, etc.). Table 602 similarly includes a "Weight Factors 220" row, a "Queue Sizes 222" row, and a "Recency Factors 226" row with one of weight factors 220, one of queue sizes 222, and one of recency factors 226 corresponding to each of tenants 208, respectively.

As shown in table 602, weight factor 220-1 is 2, weight factor 220-2 is 1, weight factor 220-3 is 3, weight factor 220-4 is 1, weight factor 220-5 is 4, and weight factor 220-6 is 1. These weight factors may indicate that tenant 208-1 is twice as important as tenant 208-2, tenant 208-4, or tenant 208-6. These weight factors may further indicate that tenant 208-3 is three times as important as tenant 208-2, tenant 208-4, or tenant 208-6, and that tenant 208-5 is four times as important as tenant 208-2, tenant 208-4, or tenant 208-6. These weight factors may further indicate that tenant 208-5 is twice as important as tenant 208-1.

Furthermore, in table 602, queue size 222-3 is 2, while all other queue sizes 222 are 1. This may indicate that work item queue 224-3 contains two work items, while the other work item queues 224 contain one work item each.

Assigning module 104 may determine work values 218 in accordance with $W(t)=w(t) \times c(t) \times r(t)$. Thus, for the example shown in table 602, assigning module 104 may determine a value of 2 for work value 218-1, a value of 1 for work value 218-2, a value of 6 for work value 218-3, a value of 1 for work value 218-4, a value of 4 for work value 218-5, and a value of 1 for work value 218-6.

Continuing with the example shown in table 602, assigning module 104 may assign probability factors 210 to tenants 208 by determining a sum of work values 218 of 15, and dividing each of work values 218 by the determined sum of 15. This may result in a probability factor 210-1 of 0.133, a probability factor 210-2 of 0.067, a probability factor 210-3 of 0.400, a probability factor 210-4 of 0.067, a probability factor 210-5 of 0.267, and a probability factor 210-6 of 0.067. Thus, when detecting module 106 detects that resource 212 (e.g., worker 216) is available, selecting module 108 may have a 13.3% chance of selecting tenant 208-1, a 6.7% chance of selecting tenant 208-2, a 40% chance of selecting tenant 208-3, a 6.7% chance of selecting tenant 208-4, a 26.7% chance of selecting tenant 208-5, and a 6.7% chance of selecting tenant 208-6.

Pointer 604 indicates that, when detecting module 106 detects that resource 212 (e.g., worker 216) is available, selecting module 108 may, using the probability factors 210 assigned to tenants 208 in table 602, probabilistically select tenant 208-5, and direct multi-tenant service system 202 to allocate resource 212 (e.g., worker 216) to tenant 208-5 for execution of a work item received from the selected tenant (e.g., a work item from work item queue 224-5). Multi-tenant service system 202 may then execute the work item, and elements of multi-tenant service system 202 and server 206 may transition to the state shown in table 606.

Table 606 illustrates a state of elements shown in table 602 after selecting module 108 selects tenant 208-5. Weight factors 220 are unchanged from table 602. Queue size 222-5 has dropped from one to zero, indicating that work item queue 224-5 is now empty. Additionally, as a result of selecting module 108 selecting tenant 208-5 in the previous operation, assigning module 104 has tracked recency factors 226 by adding a predetermined amount of 0.01 to each of recency factors 226-1 to 226-4 and 226-6, and by setting recency factor 226-5 to a predetermined value of 1.

In accordance with the foregoing, assigning module 104 may determine respective work values 218 corresponding to tenants 208 of 2.02, 1.01, 6.06, 1.01, 1.00, and 1.01. This may result in assigning module 104 determining a sum of work values 218 of 11.11. Thus, assigning module 104 may assign tenant 208-1 a probability factor 210-1 of 0.182, tenant 208-2 a probability factor 210-2 of 0.091, tenant 208-3 a probability factor 210-3 of 0.545, tenant 208-4 a probability factor 210-4 of 0.091, tenant 208-5 a probability factor 210-5 of 0.000, and tenant 208-6 a probability factor 210-6 of 0.091.

Pointer 608 indicates that, when detecting module 106 detects that resource 212 (e.g., worker 216) is available, selecting module 108 may, using the probability factors 210 assigned to tenants 208 in table 606, probabilistically select tenant 208-3, and direct multi-tenant service system 202 to allocate resource 212 (e.g., worker 216) to tenant 208-3 for execution of a work item received from the selected tenant (e.g., a work item from work item queue 224-3). Multi-tenant service system 202 may then execute the received work item, and server 206 may transition to the state shown in table 610.

Table 610 illustrates a state of elements shown in table 606 after selecting module 108 has selected tenant 208-3. Weight factors 220 are unchanged from table 606. Queue size 222-3 has dropped from two to one. Additionally, as a result of selecting module 108 selecting tenant 208-3 in the previous operation, assigning module 104 has tracked recency factors 226 by adding a predetermined amount of 0.01 to each of recency factors 226-1 and 226-2 and recency factors 226-4 to 226-6, and by setting recency factor 226-3 to a predetermined value of 1.

As in the previous scenario, assigning module 104 may determine respective work values 218 corresponding to tenants 208 of 2.04, 1.02, 1.00, 1.02, 1.01, and 1.02. This may result in assigning module 104 determining a sum of work values 218 of 8.1. Thus, assigning module 104 may assign tenant 208-1 a probability factor 210-1 of 0.252, tenant 208-2 a probability factor 210-2 of 0.126, tenant 208-3 a probability factor 210-3 of 0.370, tenant 208-4 a probability factor 210-4 of 0.126, tenant 208-5 a probability factor 210-5 of 0.000, and tenant 208-6 a probability factor 210-6 of 0.126. This process may continue until multi-tenant service system 202 has executed all work items in work item queues 224 (which may be periodically replenished with work items pulled from corresponding global work item queues, as described above).

By assigning probability factors to tenants in a multi-tenant service system, the systems and methods described herein may allow for a probabilistic selection of one of the tenants when a resource of the multi-tenant service system becomes available. This may result in a probabilistic distribution of selections across the tenants, which may provide a probabilistically fair allocation and complete usage of shared computing resources among the tenants in the multi-tenant service system.

Returning to FIG. 3, at operation 320, one or more of the systems described herein may detect that the resource of the multi-tenant service system is available. For example, detecting module 106 may detect that resource 212 of multi-tenant service system 202 is available.

Detecting module 106 may detect that resource 212 of multi-tenant service system 202 is available in any suitable way. For example, in some embodiments, resource 212 may include worker 216. After worker 216 completes a work item (e.g., evaluates a quality level of a web site), worker 216 may communicate to another component of multi-tenant service system 202 (e.g., an operating system, a worker pool management application, etc.), via a suitable messaging system, that worker 216 is available to process another task associated with another work item (e.g., evaluate a quality level of an additional web site). Detecting module 106 may detect such a communication and may thereby detect that worker 216 is available.

Returning to FIG. 3, at operation 330, one or more of the systems described herein may probabilistically select a tenant from the plurality of tenants by using the probability factors assigned to the tenants in the plurality of tenants. For example, selecting module 108 may probabilistically select a tenant from tenants 208 (e.g., one of tenants 208-1 to 208-N) by using the probability factors 210 assigned to tenants 208 (e.g., probability factor 210-1 assigned to tenant 208-1, probability factor 210-2 assigned to probability factor 210-2, etc.).

Selecting module 106 may probabilistically select a tenant from tenants 208 (e.g., one of tenants 208-1 to 208-N) by using the probability factors 210 assigned to tenants 208 (e.g., probability factors 210-1 to 210-N) in a variety of ways and contexts. For example, selecting module 106 may probabilistically select a tenant from tenants 208 by randomly selecting a number in the interval from zero to W (i.e., [0,W]), where W represents the sum of all work values 218 of tenants 208. This randomly selected number may be designated as r.

Selecting module 108 may then map the randomly selected number r to a tenant in tenants 208 (e.g., one of tenants 208-1 to 208-N) by comparing r to work value 218-1. If r is less than or equal to work value 218-1, selecting module 108 may map r to work value 218-1, and select corresponding tenant 208-1. However, if r is greater than work value 218-1, selecting module 108 may add work value 218-1 to work value 218-2, and may compare r to the sum of work value 218-1 and 218-2. If r is less than or equal to the sum of work value 218-1 and work value 218-2, then selecting module 108 may select tenant 208-2. However, if r is greater than the sum of work value 218-1 and 218-2, selecting module 108 may add the sum of work value 218-1 and work value 218-2 to work value 218-3, and compare the result to r. If r is less than or equal to the sum of work value 218-1, work value 218-2, and work value 218-3, selecting module 108 may select tenant 208-3. This process may continue in this fashion up to and including tenant 208-N, and may result in selecting module 108 probabilistically selecting one of tenants 208-1 to 208-N.

By way of illustration, referring again to table 506 in FIG. 5, tenant 208-1 has a corresponding work value 218-1 of 1, tenant 208-2 has a corresponding work value 218-2 of 0, tenant 208-3 has a corresponding work value 218-3 of 1, tenant 208-4 has a corresponding work value 218-4 of 3, tenant 208-5 has a corresponding work value 218-5 of 2, and tenant 208-6 has a corresponding work value 218-6 of 3. These work values 218 sum to 10. Thus, in the example illustrated by table 506, selecting module 108 may select a random number in the range of 0 to 10. For example, selecting module 108 may select a random number of 7. By following the process described above, selecting module 108 may map the selected random number 7 to tenant 208-5 (i.e., 1+0+1+3+2=7; 7 7), and may therefore select tenant 208-5. As another example, selecting module 108 may select a random number 5, may map that selected random number to tenant 208-4 (i.e., 1+0+1+3=6; 5 6), and may therefore select tenant 208-4.

Probabilistically selecting a tenant from tenants 208 by using probability factors 210 assigned to tenants 208 may result in a probabilistic distribution of selections across the tenants, which may result in a probabilistically fair and complete usage of shared computing resources among the tenants in the multi-tenant service system, thus allocating shared resources in multi-tenant environments.

Returning to FIG. 3, at operation 340, one or more of the systems described herein may direct the multi-tenant service system to allocate the resource to the selected tenant for execution of a work item received from the selected tenant. For example, directing module 110 may direct multi-tenant service system 202 to allocate resource 212 to the selected tenant for execution of a work item (e.g., work item 214) received from the selected tenant.

Directing module 110 may direct multi-tenant service system 202 to allocate resource 212 to the selected tenant for execution of a work item (e.g., work item 214) received from the selected tenant in any suitable way. For example, as described above, in some embodiments, resource 212 may include worker 216. When worker 216 is available to process a task associated with a work item, and selecting module 108 has selected a tenant from tenants 208, directing module 110 may direct multi-tenant service system to allocate worker 216 to the selected tenant. Multi-tenant service system 202 may pull a work item 214 from the work item queue 224 corresponding to the tenant, and may allocate (e.g., assign) worker 216 to work item 214. Worker 216 may then process a task associated with work item 214. In some examples, work item 214 may be replaced in the work item queue 224 by another work item pulled from a global queue of work items that correspond to the tenant.

Directing a multi-tenant service system to allocate shared resources based on a probabilistic selection of a tenant may cause the multi-tenant service system to more fairly (according to assigned probability factors) and more completely distribute shared resources among the tenants in the multi-tenant service system, which may improve allocation of shared resources in the multi-tenant service system.

As discussed throughout the instant disclosure, the disclosed systems and methods may provide one or more advantages over traditional multi-tenant resource allocation systems and methods. For example, probabilistically selecting a tenant to allocate a shared resource as described herein may achieve, in aggregate, a probabilistically fair utilization of shared resources that also reflects an importance of each tenant relative to the other tenants. Additionally, the systems and methods described herein may provide improved (e.g., full, complete, etc.) utilization of all shared resources of multi-tenant service system 202, particularly under inconsistent or "bursty" workloads. Furthermore, by deciding at each particular moment of resource availability how best to allocate an available shared resource based on an amount of work (e.g., work values 218) that exists in the system, the systems and methods of the instant disclosure may allow a multi-tenant service system to self-balance shared resources, and thus complete workloads more efficiently.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive one or more weight factors to be transformed into probability factors, transform the weight factors into probability factors, output a result of the transformation to assign probability factors to tenants in a multi-tenant service system, use the result of the transformation to probabilistically select a tenant in a multi-tenant service system, and store the result of the transformation to further determine additional probability factors and/or make additional probabilistic selections of tenants in the multi-tenant service system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    for each tenant in a plurality of tenants within a multi-tenant service system, assigning a probability factor to the tenant that indicates a likelihood that the tenant will be selected when a resource of the multi-tenant service system is available by determining a work value corresponding to the tenant based on:
        a number of work items in a work item queue associated with the tenant that includes at least one enqueued work item; and
        a cost factor representative of a cost of execution of the enqueued work item;
    detecting that the resource of the multi-tenant service system is available;
    probabilistically selecting a tenant from the plurality of tenants by using the probability factors assigned to the tenants in the plurality of tenants; and
    directing the multi-tenant service system to allocate the resource to the selected tenant for execution of a work item received from the selected tenant.

2. The computer-implemented method of claim 1, wherein determining the work value corresponding to the tenant is based on a weight factor corresponding to the tenant that indicates an importance of the tenant relative to at least one additional tenant in the plurality of tenants.

3. The computer-implemented method of claim 1, wherein:
    determining the work value corresponding to the tenant comprises tracking a recency factor corresponding to the tenant that is representative of a number of selections that have been made since the tenant was previously selected; and
    determining the work value corresponding to the tenant is based on the tracked recency factor.

4. The computer-implemented method of claim 3, wherein tracking the recency factor corresponding to the tenant comprises:
    setting the recency factor corresponding to the tenant to a predetermined value when the tenant is selected; and
    adding a predetermined amount to the recency factor corresponding to the tenant when a different tenant in the plurality of tenants is selected.

5. The computer-implemented method of claim 1, wherein assigning the probability factor to the tenant comprises:
determining:
a sum of a plurality of work values, each work value in the plurality of work values corresponding to a different tenant in the plurality of tenants; and
a quotient of the work value corresponding to the tenant divided by the sum of the work values; and
designating the quotient as the probability factor corresponding to the tenant.

6. The computer-implemented method of claim 1, wherein determining the work value corresponding to the tenant comprises:
calculating a product of:
a weight factor corresponding to the tenant that indicates an importance of the tenant relative to at least one additional tenant in the plurality of tenants,
a number of work items in the work item queue associated with the tenant;
a recency factor corresponding to the tenant that is representative of a number of selections that have been made since the tenant was previously selected; and
designating the calculated product as the work value corresponding to the tenant.

7. The computer-implemented method of claim 6, wherein assigning the probability factor to the tenant further comprises determining:
a sum of a plurality of work values, each work value in the plurality of work values corresponding to a different tenant in the plurality of tenants; and
assigning the probability factor to the tenant is further based on the work value corresponding to the tenant and the sum of the plurality of work values.

8. The computer-implemented method of claim 7, wherein probabilistically selecting the tenant from the plurality of tenants by using the probability factors assigned to the tenants in the plurality of tenants comprises:
randomly selecting a number based on the sum of the plurality of work values; and
mapping the randomly selected number to the tenant based on the work value corresponding to the tenant.

9. The computer-implemented method of claim 1, wherein the resource of the multi-tenant service system comprises a worker of the multi-tenant service system that is configured to process a task associated with the work item.

10. The computer-implemented method of claim 1, wherein detecting that the resource of the multi-tenant service system is available comprises:
tracking a usage of the resource of the multi-tenant service system; and
anticipating, based on the tracked usage of the multi-tenant service system, that the resource is likely to be available at a particular time.

11. A system comprising:
an assigning module, stored in memory, that, for each tenant in a plurality of tenants within a multi-tenant service system, assigning a probability factor to the tenant that indicates a likelihood that the tenant will be selected when a resource of the multi-tenant service system is available by determining a work value corresponding to the tenant based on:
a number of work items in a work item queue associated with the tenant that includes at least one enqueued work item; and
a cost factor representative of a cost of execution of the enqueued work item;
a detecting module, stored in memory, that detects that the resource of the multi-tenant service system is available;
a selecting module, stored in memory, that probabilistically selects a tenant from the plurality of tenants by using the probability factors assigned to the tenants in the plurality of tenants;
a directing module, stored in memory, that directs the multi-tenant service system to allocate the resource to the selected tenant for execution of a work item received from the selected tenant; and
at least one physical processor that executes the assigning module, the detecting module, the selecting module, and the directing module.

12. The system of claim 11, wherein the assigning module determines the work value corresponding to the tenant based on a weight factor corresponding to the tenant that indicates an importance of the tenant relative to at least one additional tenant in the plurality of tenants.

13. The system of claim 11, wherein:
the assigning module determines the work value corresponding to the tenant by tracking a recency factor corresponding to the tenant that is representative of a number of selections that have been made since the tenant was previously selected; and
determines the work value corresponding to the tenant based on the tracked recency factor.

14. The system of claim 13, wherein the assigning module tracks the recency factor corresponding to the tenant by:
setting the recency factor corresponding to the tenant to a predetermined value when the tenant is selected; and
adding a predetermined amount to the recency factor corresponding to the tenant when a different tenant in the plurality of tenants is selected.

15. The system of claim 11, wherein the assigning module assigns the probability factor to the tenant by:
determining:
a sum of a plurality of work values, each work value in the plurality of work values corresponding to a different tenant in the plurality of tenants; and
a quotient of the work value corresponding to the tenant divided by the sum of the work values; and
designating the quotient as the probability factor corresponding to the tenant.

16. The system of claim 11, wherein the assigning module further determines the work value corresponding to the tenant by:
calculating a product of:
a weight factor corresponding to the tenant that indicates an importance of the tenant relative to at least one additional tenant in the plurality of tenants,
a number of work items in the work item queue associated with the tenant;
a recency factor corresponding to the tenant that is representative of a number of selections that have been made since the tenant was previously selected; and
designating the calculated product as the work value corresponding to the tenant.

17. The system of claim 16, wherein:
the assigning module assigns the probability factor to the tenant further by determining a sum of a plurality of work values, each work value in the plurality of work values corresponding to a different tenant in the plurality of tenants; and the assigning module assigns the probability factor to the tenant further based on the work value corresponding to the tenant and the total of the plurality of work values.

18. The system of claim 17, wherein the selecting module probabilistically selects the tenant from the plurality of tenants by using the probability factors assigned to the tenants in the plurality of tenants by:
   randomly selecting a number based on the sum of the plurality of work values; and
   mapping the randomly selected number to the tenant based on the work value corresponding to the tenant.

19. The system of claim 11, wherein the detecting module detects that the resource of the multi-tenant service system is available by:
   tracking a usage of the resource of the multi-tenant service system; and
   anticipating, based on the tracked usage of the multi-tenant service system, that the resource is likely to be available at a particular time.

20. A non-transitory computer-readable medium comprising instructions that, when executed by at least one processor of a computing system, cause the computing system to:
   for each tenant in a plurality of tenants within a multi-tenant service system, assign a probability factor to the tenant that indicates a likelihood that the tenant will be selected when a resource of the multi-tenant service system is available by determining a work value corresponding to the tenant based on:
      a number of work items in a work item queue associated with the tenant that includes at least one enqueued work item; and
      a cost factor representative of a cost of execution of the enqueued work item;
   detect that the resource of the multi-tenant service system is available;
   probabilistically select a tenant from the plurality of tenants by using the probability factors assigned to the tenants in the plurality of tenants; and
   direct the multi-tenant service system to allocate the resource to the selected tenant for execution of a work item received from the selected tenant.

* * * * *